(12) United States Patent
Wang et al.

(10) Patent No.: US 7,142,975 B2
(45) Date of Patent: Nov. 28, 2006

(54) VIRTUAL CYLINDER PRESSURE SENSOR WITH INDIVIDUAL ESTIMATORS FOR PRESSURE-RELATED VALUES

(75) Inventors: Junmin Wang, Helotes, TX (US); Ryan C. Roecker, Helotes, TX (US); Charles E. Roberts, Jr., Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/110,120

(22) Filed: Apr. 20, 2005

(65) Prior Publication Data

US 2005/0251322 A1 Nov. 10, 2005

Related U.S. Application Data

(60) Provisional application No. 60/563,887, filed on Apr. 20, 2004.

(51) Int. Cl.
*G01M 15/00* (2006.01)
(52) U.S. Cl. ...................................................... 701/114
(58) Field of Classification Search ................ 701/102, 701/110, 114, 115; 73/117.3; 123/406.22, 123/406.27
See application file for complete search history.

(56) References Cited

U.S. PATENT DOCUMENTS

| | | | |
|---|---|---|---|
| 5,093,792 A | 3/1992 | Taki et al. | 364/431.01 |
| 5,559,285 A | 9/1996 | Bryant et al. | 73/117.3 |
| 6,236,908 B1 | 5/2001 | Cheng et al. | 701/1 |
| 6,272,426 B1 | 8/2001 | Tascillo | 701/106 |
| 6,460,408 B1 | 10/2002 | Gimmler et al. | 73/117.3 |
| 6,553,305 B1 | 4/2003 | Dixon et al. | 701/102 |
| 6,925,373 B1 * | 8/2005 | La Rosa et al. | 701/109 |
| 2002/0087256 A1 | 7/2002 | Dixon et al. | 701/102 |
| 2005/0091294 A1 * | 4/2005 | Tuken et al. | 708/200 |

* cited by examiner

*Primary Examiner*—Hieu T. Vo
(74) *Attorney, Agent, or Firm*—Baker Botts L.L.P.

(57) ABSTRACT

A virtual cylinder pressure sensor for use with an internal combustion engine. The sensor has one or more independent modules, each used to estimate a different cylinder pressure variable. Each module is trained using measurement data from a physical cylinder pressure sensor and a real engine. After the modules are trained, they can be embedded into the engine control unit of the same engine type, and used to estimate and predict the values for which they were trained.

20 Claims, 4 Drawing Sheets

US 7,142,975 B2

VIRTUAL CYLINDER PRESSURE SENSOR WITH INDIVIDUAL ESTIMATORS FOR PRESSURE-RELATED VALUES

RELATED APPLICATION

This application claims priority to U.S. provisional patent application No. 60/563,887, entitled "Virtual Cylinder Pressure Sensor with Individual Variable-Oriented Independent Estimators," filed on Apr. 20, 2004, the full disclosure of which is incorporated herein by reference.

TECHNICAL FIELD OF THE INVENTION

This invention relates to internal combustion engines, and more particularly to a virtual sensor for measuring cylinder pressure in an internal combustion engine.

BACKGROUND OF THE INVENTION

In the field of internal combustion engines, cylinder pressure is an important source of data about the combustion process. In particular, many aspects of engine control can be improved with cylinder pressure data. As examples, cylinder pressure data can be used as a feedback to the engine controller, to refer combustion timing, to detect misfire, and to indicate peak cylinder pressure.

Today, extensive engine performance improvement research is being done using cylinder pressure sensors as information sources. However, one problem associated with their use is that they are too expensive to be implemented in production engines.

Furthermore, today's cylinder pressure sensors tend to be too fragile for implementation in production engines. Even for laboratory testing purposes, due to the harsh in-cylinder environment of internal combustion engines (such as high-temperature, high-pressure and strong chemical corrosion) existing cylinder pressure sensors can be unreliable.

DETAILED DESCRIPTION OF THE INVENTION

As stated in the Background, cylinder pressure measurements are important to research and development of internal combustion engines. A measured cylinder pressure signal can provide a tremendous amount of useful information about the combustion process.

Cylinder Pressure Signals and Extracted Data

Figure 1:
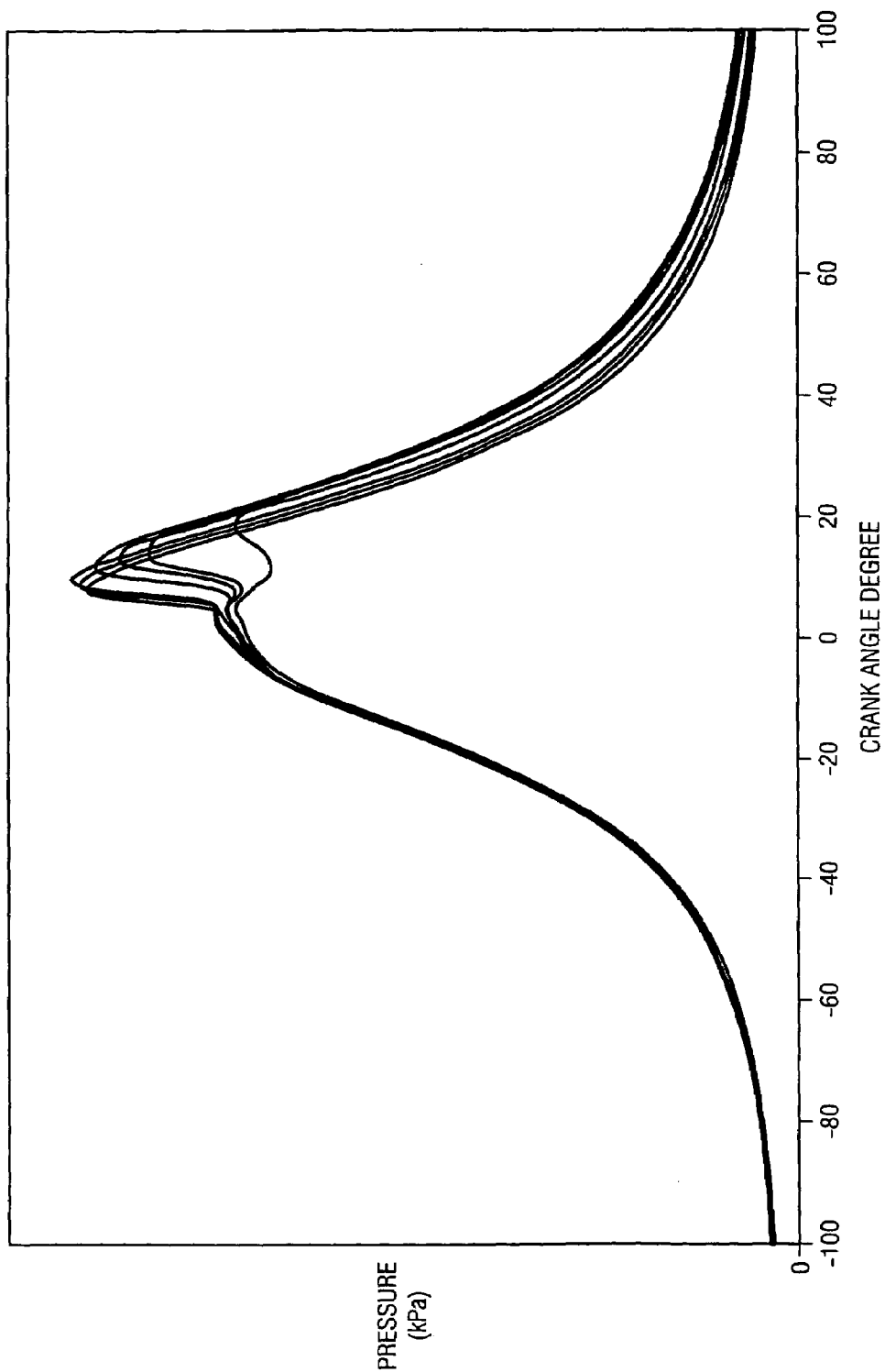
FIG. 1 illustrates measured cylinder pressure signals from a physical cylinder pressure sensor for various equivalence ratios.

FIG. 1 illustrates measured cylinder pressure signals from a physical cylinder pressure sensor for various equivalence ratios (ratios of the actual fuel/air ratio to the stoichiometric fuel/air ratio). The cylinder pressure in crank angle degree (CAD) domain is a function of many engine operating parameters, such as speed, injection timing, air flowrate, and EGR (exhaust gas recirculation) rate.

The following description is directed to a model-based cylinder pressure sensor. This sensor is also referred to herein as a "virtual" sensor, and can be used instead of a physical cylinder pressure sensor in an actual engine. The virtual sensor provides estimates of cylinder pressure values accurately and robustly over the entire engine operating range.

Like the sensor of FIG. 1, the virtual sensor can provide information about the engine crank shaft position. It can also provide all other information that can be extracted from a physical cylinder pressure sensor output signal. FIG. 1 is but one example of how the cylinder pressure can have a known relationship to one or more operating conditions of a particular engine.

Virtual Cylinder Pressure Sensor

Figure 2:
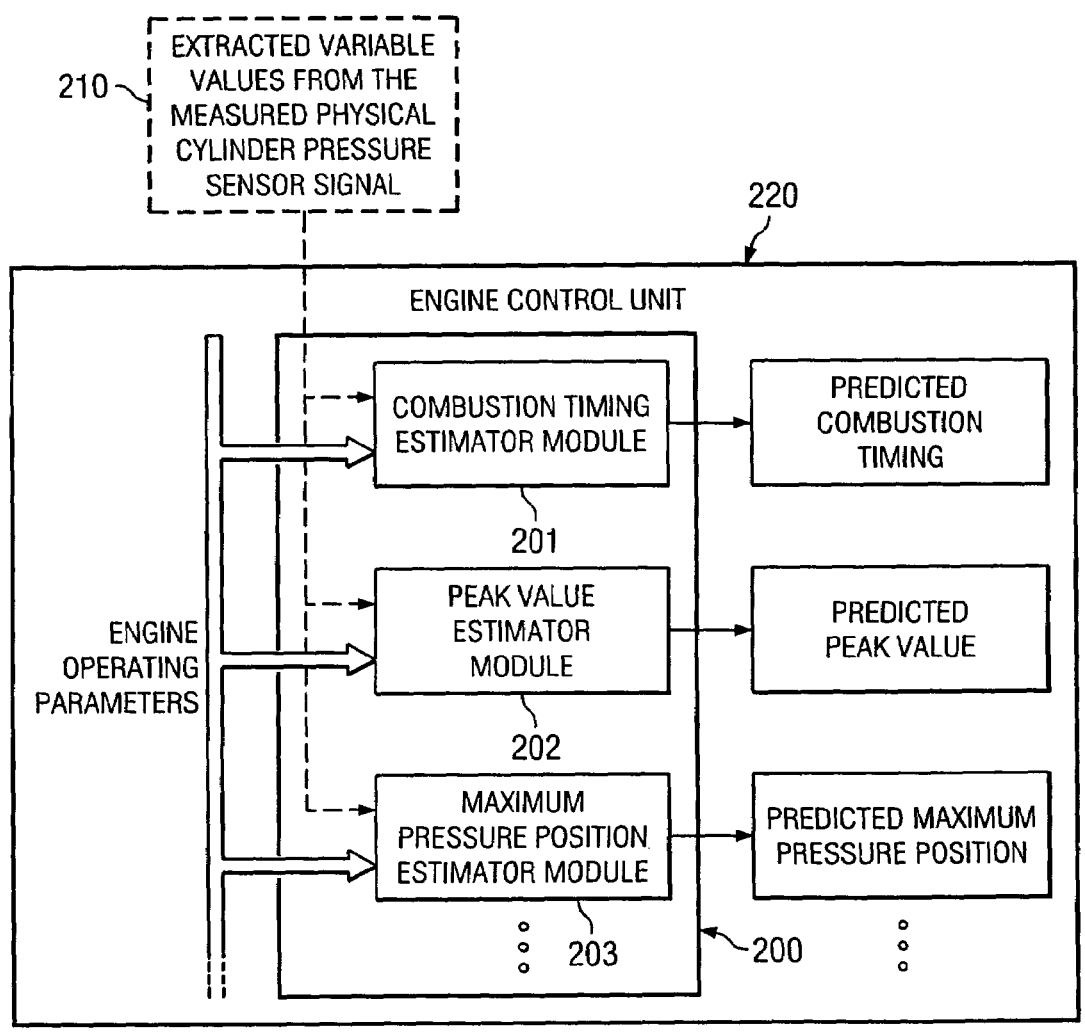
FIG. 2 illustrates an example of a virtual cylinder pressure sensor in accordance with the invention.

FIG. 2 illustrates one embodiment of a virtual cylinder pressure sensor 200 in accordance with the invention. As explained below, sensor 200 has individual and independent estimator modules, which use neural networks to estimate and predict various variables that could otherwise be provided by physical cylinder pressure sensors. The data provided by sensor 200 can be delivered to an engine control system 220.

In the example of FIG. 2, sensor 200 has three modules: a combustion timing estimation module 201, a cylinder pressure peak value estimation module 202, and a maximum pressure position estimation module 203. Each of these modules corresponds to a variable that can be extracted from cylinder pressure measurement data, such as that of FIG. 1.

Additional estimation modules can be added, depending on the needs of the engine control system 220 and availability of measurement data from a physical cylinder pressure sensor for training purposes. Examples of other modules are modules for estimating a maximum rising rate value, a pressure inflection value, a pressure inflection position, a second peak value, or a second peak value position.

The inputs to each module during both training and subsequent use are generally referred to as "engine operating conditions". Typical examples are intake manifold pressure, intake manifold temperature, coolant temperature, and exhaust gas recirculation (EGR) rate. Other input data could include engine control parameters such as injection timing, injection fuel mass, and injection pressure. Each module may require some or all of these parameters as inputs.

Each module 201–203 is "trained" using extracted values from a measured physical cylinder pressure signal. Each module provides a different pressure variable that can be extracted from a physical cylinder pressure sensor.

The module inputs indicated with dotted lines are used for training purposes only. Modules 201–203 may be developed using techniques known in the art of neural networks, as well as by physical principles between inputs and outputs of the modules. Once the training process is finished and the modules are verified, these inputs are removed and sensor 200 is ready for use in production engines.

The virtual cylinder pressure sensor modules 201–203 may be trained on developing engines that have physical cylinder pressure sensors. The output signal of a physical cylinder pressure sensor installed on a development engine is used to train the modules 201–203 of the virtual cylinder pressure sensor 200 for the same type of engine. The modules 201–203 may be trained for both steady state and transient conditions.

During engine operation, each module 201–203 is programmed to receive relevant engine operating parameters. Typically, these parameters are real time measurements from physical engine sensors, but depending on the module, stored or calculated engine operating condition data may be used as input.

For each module, the module input is whatever engine operating parameter is required to obtain its associated pressure variable, the output is the estimated individual variable. The module either accesses stored data or performs calculations, or both, to obtain the desired output estimate. When virtual sensor 200 is implemented in a production engine, its programming may be "stand-alone" or it may be integrated with other programming of the engine control unit 220. Once embedded into the engine control system, sensor 200 provides its variables to the engine control system in real-time.

As indicated in FIG. 2, a feature of virtual sensor 200 is that the cylinder pressure signal is split. Individual variable-oriented independent estimator modules 201–203 are used to construct the virtual sensor. The use of the independent modules 201–203 permits different cylinder pressure variables to be separately derived, as opposed to the deriving the whole cylinder pressure profile.

In effect, sensor 200 avoids the complications associated with coupling a cylinder pressure signal. This increases the accuracy and robustness of the virtual sensor 200. Sensor 200 eliminates the cost of a physical sensor, and it easy to implement into a production engine.

Modules 201–203 each provide the capability to predict its associated cylinder pressure information even before the actual cylinder pressure reaches that point. This is before a measurement from a physical cylinder pressure sensor would be available. Therefore, it gives engine control unit 220 enough time to perform compensations and/or control strategies to obtain optimal performances in both steady state and transient conditions.

Sensor 200 may further be used to monitor the health of a physical cylinder pressure sensor. Any one or more of its modules 201–203 could be used as a fault-diagnostic device for a physical cylinder pressure sensor if cheap and reliable physical cylinder pressure sensors become available in the future.

Overview of Method of Training and Using

Figure 3:
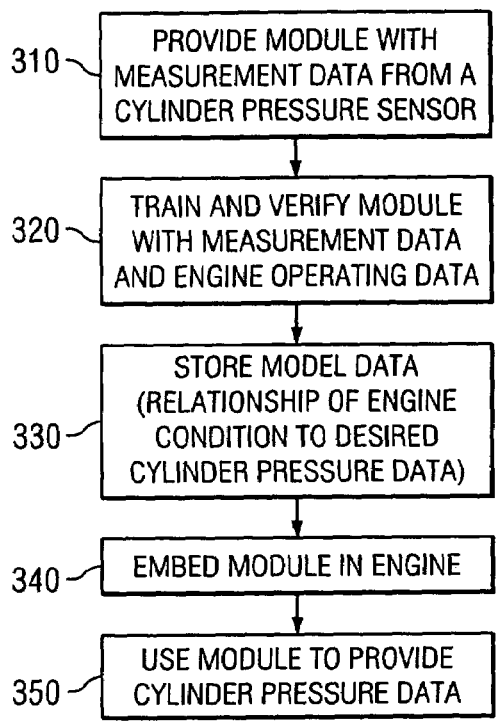
FIG. 3 illustrates the process of training and using one of the modules of FIG. 2.

FIG. 3 illustrates a process of training and using a module of sensor 200.

In Step 310, the module is provided with data from a physical cylinder pressure sensor. The data is "extracted" data in the sense that it represents a particular variable that can be extracted from the cylinder pressure signal. The examples used in this description are combustion timing, peak value, and maximum position, but any of the signal characteristics of FIG. 1 could be extracted. The module is programmed to receive this data for use in neural network type training.

In Step 320, the module is trained by the corresponding variable extracted from the measured signal of a physical cylinder pressure sensor installed on an engine. The result of the training is a "model", which represents the relationship, over the range of operation of the engine, between a given set of operating conditions and the desired cylinder pressure data. The module is verified by comparing its output to that of a known-to-be-reliable sensor.

In Step 330, the model data is stored or otherwise made accessible to engine control software.

In Step 340, the module is embedded (by software, firmware, hardware, or some combination of these) into the engine control unit. The engine is assumed to be the same as, or of like type, as that used for training, and need not have a physical cylinder pressure sensor installed.

In Step 350, the module is used to estimate current (or predict future) values for the desired cylinder pressure data. This data may be provided in real time (or ahead of time) to the engine control unit.

Demonstration Data

For demonstration purposes, development and verification data were taken from a Peugeot DW10 diesel engine. The engine parameters are:

| Engine Parameters | Values |
| --- | --- |
| Engine model | Peugeot DW10 |
| Number of cylinders | 4 |
| Bore | 85 mm |
| Stroke | 88 mm |
| Connecting rod length | 145 mm |
| Rated power | 82 kW |
| Rated Speed | 4000 rpm |
| Peak torque | 250 Nm |
| Peak torque speed | 2000 rpm |
| Displacement | 2.0 L |
| Fuel System | Bosch HPCR |
| Compression ratio | 18:1 |

A Kistler 6053C60 cylinder pressure transducer was installed on the first cylinder of the engine through a glow plug adapter. A 720 count encoder was installed on the crankshaft of the engine and the physical cylinder pressure signal was sampled at each rising edge of the encoder pulse signal, which gives the sampling rate of 0.5 CAD for the cylinder pressure in crank angle domain. The cylinder pressure signal was taken at the steady state and averaged over 100 cycles.

Once combustion begins, the cylinder pressure signal becomes very noisy and can be filtered to have good calculation for the model development. Conventional causal digital filters can remove the noise but they will introduce delay to the filtered signal, which, however, is not desired for this application in terms of estimating the maximum rising rate position. Thus, a 3-point non-causal moving average digital filter was used to filter out the cylinder pressure signal and remove the combustion noise. This filter effectively removes the noise without introducing any delay. A numerical differentiator with 3-point centered rule was used to calculate the derivative of the filtered cylinder pressure in crank angle domain.

To develop, train, and verify the neural network-based models, training and verification data sets were taken from the actual engine. Test conditions for model development and verification were specified for the following actuators and their settings:

| | |
| --- | --- |
| Engine Speed | 2000 rpm |
| Injection Timing | 2.0~14.0 bTDC deg |
| Injection Fuel Mass | 8.05~35.05 mg/stroke |
| Rail Pressure | 800 40 bar |
| Waste Gate | Fully open, maximum boost |
| EGR Valve | Fully closed |
| Swirl Control Valve | Fully open |

Figure 4:
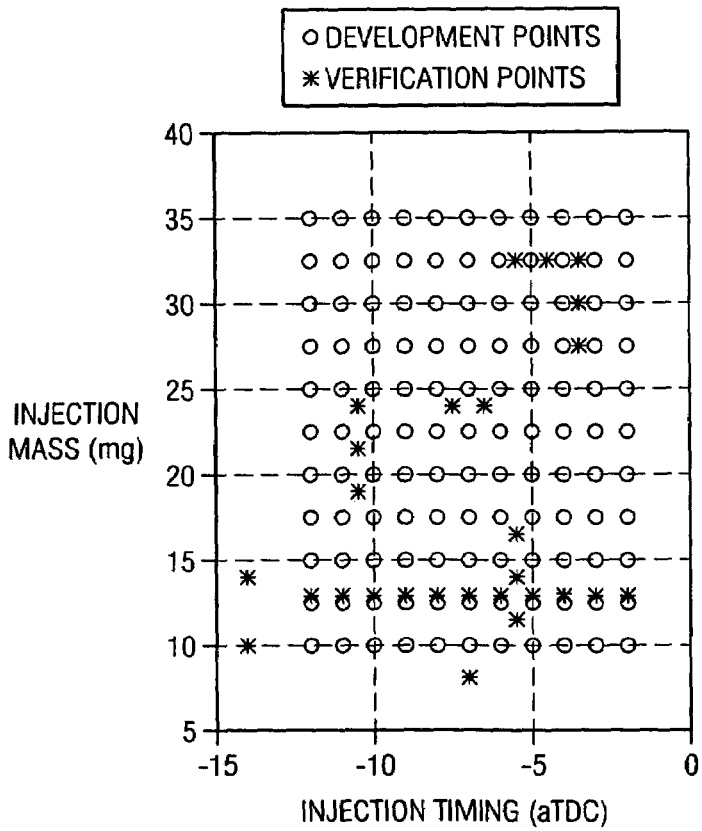
FIG. 4 illustrates an example of a model development and verification matrix.

FIG. 4 illustrates development and verification matrices. Among them, 121 development points were used to train the neural network-based models. Another set of 27 different verification points, which were not used for the model training (have not been seen by the neural network-based models), were used to verify behaviors, correctness, and generalization capability of the models once the training process is finished.

For purposes of demonstration, the scope of varying actuators were limited. However, in practice, the sensor 200 can be extended for the full scope of engine operation conditions.

As examples of the invention, two neural network-based independent estimator modules were developed and tested at steady state. These two modules were for estimating cylinder pressure maximum rising rate position (MRP) and the maximum cylinder pressure value.

Maximum Rising Rate Position Estimation Module

Generally, it is desired to have as few parameters in the neural networks as possible for a given size training data set. For this module, the major input variables were selected as the injection timing and the injection fuel mass only. For the given size of the training data set, to ensure the model accuracy and avoiding model over-fitting, a two-layer five-neuron network structure was selected to develop the model.

Figure 5:
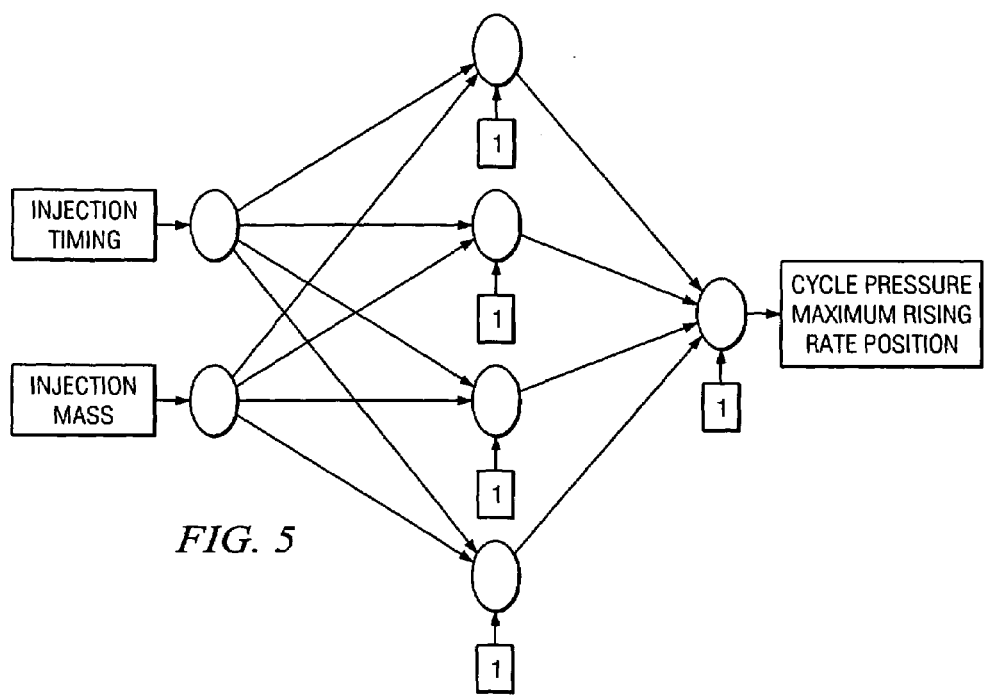
FIG. 5 illustrates the neural network structure for a maximum rising rate position estimator module.

FIG. 5 illustrates the neural network structure, which is a two-layer five-neuron network. It has 2 inputs (injection timing and injection mass), 1 output (predicted maximum rising rate position), 2 layers (hidden layer and output layer), and 5 neurons (4 neurons in the hidden layer and 1 neuron in the output layer).

The model development data set was put in supervised learning mode to train the model by using the backpropagation learning rule with Levenberg-Marquardt (LM) algorithm. A hyperbolic tangent sigmoid transfer function was employed for the hidden layer.

Maximum Cylinder Pressure Estimation Module

Two different models for the maximum cylinder pressure estimation, without intake manifold absolute pressure (MAP) as input and with intake manifold pressure as input, were developed and compared.

For the model without the MAP as input, a 2-layer 5-neuron network structure similar to that of the maximum rising rate position model (described above) was used. The inputs were the injection timing and the injected fuel mass. The output was the predicted maximum cylinder pressure.

A comparison between the predicted outputs by the trained neural network and the measured values revealed that the model matched the measured values at most of the points except some interesting points. At those points, the measured intake manifold pressures were irregularly higher than the values of the points in the neighborhoods. And as a result, the corresponding measured maximum cylinder pressure values at these points are also irregularly higher than the values of the points in the neighborhoods. It is understandable because higher intake manifold pressure will bring more gas into the cylinder and will increase both the motoring pressure and combustion pressure. With the consideration that the intake manifold pressure will affect both the combustion and the motoring pressures, a second neural network model was proposed.

Figure 6:
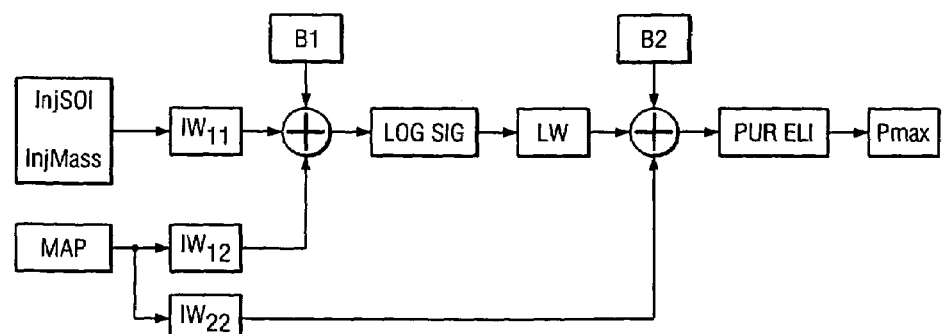
FIG. 6 illustrates the neural network structure for a maximum cylinder pressure module.

FIG. 6 illustrates a 2-input 2-layer 4-neuron network (3 neurons for hidden layer and 1 neuron for the output layer). The input variables to the network are not only the injection timing and injected fuel mass but also the intake manifold pressure. The MAP is connected to both the first and the second layers because it will contribute for both the combustion and motoring pressures. The same model development procedure as described above was applied for this model.

The neural network of FIG. 6 produced more accurate results compared with the results of the network without the MAP as input. The predicted maximum cylinder pressure values by the trained neural network have corresponding characteristics in terms of the irregularly higher values at the points with irregularly higher intake manifold pressures.

By following the same model development procedure described above, other cylinder pressure related individual variable oriented estimation models could be developed as well based on the requirement of the engine control system and the fault diagnostic module. The same model development process can be applied to the gasoline spark ignition engines as well.

The models described above are for the steady state condition. For the sensor 200 to work in the transient conditions, dynamic neural networks (with delay components) are required. Because the cylinder pressure is a function of the in-cylinder condition and the engine control commands (such as injection information for diesel engines, spark timing for gasoline engines), only those engine operating parameters that affect the in-cylinder condition along with the control commands need to be considered as the inputs. For some of these parameters, such as EGR, not only their values in the current cycle but also their values in the previous cycles will affect the cylinder pressure of the current cycle. Therefore, high-order estimators that take the input variables of the previous cycles into account will improve the performance of the sensor 200. The transient behaviors can be modeled by using the dynamic neural networks with tapped delay lines, which can combine both the current input signal and its previous values in both time and crank angle domains together as an input vector to the network.

What is claimed is:

1. A virtual cylinder pressure sensor for an internal combustion engine, comprising:

at least one estimator module, operable to receive engine operating data and to output estimated cylinder pressure data;

wherein the estimator module is operable to access model data representing the relationship between measurement data extracted from a physical pressure sensor and data representing at least one engine operating condition associated with the measurement data, and to use to the model data to provide the estimated cylinder pressure data in response to engine operating condition data.

2. The sensor of claim 1, wherein the estimated cylinder pressure data is combustion timing data.

3. The sensor of claim 1, wherein the estimated cylinder pressure data is peak value data.

4. The sensor of claim 1, wherein the estimated cylinder pressure data is maximum pressure data.

5. The sensor of claim 1, wherein the estimated cylinder pressure data is maximum rising rate value.

6. The sensor of claim 1, wherein the estimated cylinder pressure data is pressure inflection value.

7. The sensor of claim 1, wherein the estimated cylinder pressure data is pressure inflection position.

8. The sensor of claim 1, wherein the estimated cylinder pressure data is second peak value.

9. The sensor of claim 1, wherein the estimated cylinder pressure data is second peak value position.

10. The sensor of claim 1, wherein the sensor has one or more modules of the following type: a combustion timing data module, a peak value data module, and maximum pressure data module.

11. The sensor of claim 1, wherein the engine operating conditions are at least one or more from the group comprising: intake manifold pressure, intake manifold temperature, coolant temperature, and exhaust gas recirculation (EGR) rate.

12. The sensor of claim 1, wherein the engine operating conditions are at least one or more from the group comprising: injection timing, injection fuel mass, and injection pressure.

13. The sensor of claim 1, wherein the sensor is implemented with programming integrated into the programming of an engine control unit for the engine.

14. A method of providing cylinder pressure data to an engine control system of an internal combustion engine, comprising:

training at least one estimator module, using measurement data extracted from a physical pressure sensor and data representing at least one engine operating condition associated with the measurement data to establish a model of the relationship between the measurement data and engine operating condition data;

embedding the module into engine control programming; and during operation of the engine, using the module to receive engine operating data, to access the model data, and to output the cylinder pressure data.

15. The method of claim 14, wherein the estimated cylinder pressure data is combustion timing data.

16. The method of claim 14, wherein the estimated cylinder pressure data is peak value data.

17. The method of claim 14, wherein the estimated cylinder pressure data is maximum pressure data.

18. The method of claim 14, wherein the training step is performed using a neural network.

19. The method of claim 14, wherein the step of using the module is performed by receiving current engine operating data and estimating pressure data associated with the current engine conditions.

20. The method of claim 14, wherein the step of using the module is performed by receiving current engine operating data and predicting pressure data associated with future engine operating conditions.

* * * * *